(12) United States Patent
Strobel et al.

(10) Patent No.: US 11,947,020 B2
(45) Date of Patent: Apr. 2, 2024

(54) METHOD FOR PROVIDING GNSS SENSOR DATA

(71) Applicant: Robert Bosch GmbH, Stuttgart (DE)

(72) Inventors: Jens Strobel, Freiberg Am Neckar (DE); Michael Baus, Bietigheim-Bissingen (DE); Mohammad Tourian, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/504,596

(22) Filed: Oct. 19, 2021

(65) Prior Publication Data

US 2022/0128706 A1 Apr. 28, 2022

(30) Foreign Application Priority Data

Oct. 22, 2020 (DE) ...................... 10 2020 213 318.2

(51) Int. Cl.
G01S 19/25 (2010.01)
G01S 19/08 (2010.01)
G01S 19/38 (2010.01)
G01S 19/40 (2010.01)

(52) U.S. Cl.
CPC .......... *G01S 19/254* (2013.01); *G01S 19/258* (2013.01); *G01S 19/08* (2013.01); *G01S 19/38* (2013.01); *G01S 19/40* (2013.01)

(58) Field of Classification Search
CPC ...... G01S 19/254; G01S 19/258; G01S 19/40; G01S 19/08; G01S 19/38
USPC ............. 342/357.21, 357.23, 357.45, 357.64
See application file for complete search history.

(56) References Cited

U.S. PATENT DOCUMENTS

| | | | | |
|---|---|---|---|---|
| 8,154,447 B2* | 4/2012 | Uchida | ................... | G01S 19/27 |
| | | | | 342/357.67 |
| 9,182,495 B2* | 11/2015 | Stevens | ................... | G01S 19/20 |
| 10,247,576 B2* | 4/2019 | Heide | ................ | G01D 3/08 |
| 10,809,388 B1 | 10/2020 | Carcanague et al. | | |
| 10,935,663 B2* | 3/2021 | Biacs | ................ | G01S 19/20 |
| 11,442,172 B2* | 9/2022 | Biacs | ................ | G01S 19/08 |
| 2013/0194132 A1* | 8/2013 | Kim | ................ | G01S 19/20 |
| | | | | 342/357.64 |
| 2014/0232595 A1 | 8/2014 | Rife | | |
| 2017/0089723 A1* | 3/2017 | Heide | ................. | G01C 21/165 |

FOREIGN PATENT DOCUMENTS

| | | | | | |
|---|---|---|---|---|---|
| CA | 3012499 A1 | * | 2/2019 | ............ | G01S 19/22 |
| DE | 102008015107 A1 | * | 11/2009 | ............ | G01C 21/28 |
| DE | 102008024263 A1 | * | 12/2009 | ............. | G01S 19/40 |
| JP | 5186874 B2 | * | 4/2013 | ............. | G01S 19/32 |
| JP | 2022068868 A | * | 5/2022 | ............. | G01S 19/40 |
| KR | 20150117737 A | * | 10/2015 | ............. | G01S 19/20 |
| WO | WO-2022090557 A1 | * | 5/2022 | ............. | G01S 19/41 |

* cited by examiner

*Primary Examiner* — Chuong P Nguyen
(74) *Attorney, Agent, or Firm* — Maginot, Moore & Beck LLP

(57) ABSTRACT

The disclosure concerns a method for providing GNSS sensor data, comprising at least the following steps: (a) receiving GNSS satellite signals; (b) evaluating the received GNSS satellite signals to ascertain GNSS sensor data; (c) rating the received GNSS satellite signals on the basis of at least one GNSS-specific performance criterion; and (d) associating a rating that results from step (c) with the related GNSS sensor data.

18 Claims, 2 Drawing Sheets

METHOD FOR PROVIDING GNSS SENSOR DATA

Figure 1:
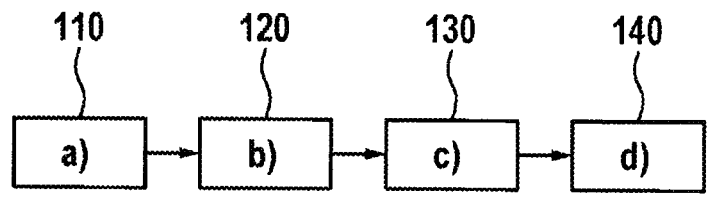

The invention concerns a method for providing GNSS sensor data, a computer program for carrying out the method, a machine-readable storage medium containing the computer program and a GNSS sensor for carrying out the method. The invention can in particular be used for GNSS-based location systems for autonomous or semiautonomous driving.

PRIOR ART

The Global Navigation Satellite System (GNSS) can be used to perform geospatial position determination at any point on Earth. A GNSS satellite circles the earth and transmits coded signals that the GNSS receiver uses to calculate the range, or the distance, from the receiver to the satellite by estimating the time difference between the time of signal reception and the transmission time. The estimated ranges to satellites can be converted into an estimate of the position of the receiver by GNSS sensors, for example, if enough satellites are tracked (typically more than 5). At present, there are more than 130 GNSS satellites circling the earth, which means that normally no more than 65 of them are visible on the local horizon.

In view of the attitude of the satellites in the sky and the environmental obstacles, there are always some satellites that are blocked and not visible on a (direct) line of sight of the receiver, but rather may arrive at the receiver in a reflected manner. The question then arises as to how the performance of the estimated outputs can be improved and, as far as possible, a GNSS sensor or a GNSS-based location sensor can be prevented from obtaining an erroneous position, velocity, attitude, acceleration, etc.

DISCLOSURE OF THE INVENTION

The proposal here, according to claim 1, is a method for providing GNSS sensor data, comprising at least the following steps:
a) receiving GNSS satellite signals,
b) evaluating the received GNSS satellite signals to ascertain GNSS sensor data,
c) rating the received GNSS satellite signals on the basis of at least one GNSS-specific performance criterion,
d) associating a rating that results from step c) with the related GNSS sensor data.

Steps a), b), c) and d) can be carried out at least once and/or repeatedly or multiple times in succession in the indicated order, for example, for the purpose of carrying out the method. In addition, steps a), b), c) and d), in particular steps b) and c), can at least sometimes be carried out in parallel or at the same time. The method can be carried out by means of a GNSS sensor, for example. The GNSS sensor data can be provided as output data from the GNSS sensor.

The method is used in particular to provide GNSS sensor data and related ratings about the performance, reliability and/or quality (or quality level) of the sensor data. The method advantageously permits critical surroundings and/or states to be handled, in particular those in which the ambient conditions cannot be monitored or at least cannot be monitored adequately using a surroundings sensor or environment sensor (e.g. camera sensor, LIDAR sensor, RADAR sensor or ultrasonic sensor of a vehicle). The method can in particular advantageously contribute to taking (suitable) containing measures in order to improve and/or guarantee the performance, reliability and/or quality (or quality level) of the GNSS sensor data (e.g. output signals from a GNSS positioning sensor or GNSS-based location sensor) as far as possible. A contribution by the method to the selection of (suitable, strategic) containing measures can in particular involve ascertaining constraints relating to the availability and/or reliability of input signals for a GNSS sensor and/or relating to environmental aspects and in particular providing said constraints in the form of a rating.

By way of example, the method can also comprise a step e) in which a (suitable) containing measure is taken in view of the rating associated in step d) in order to improve the performance, reliability and/or quality (or quality level) of the sensor data to be provided. By way of illustration, the containing measure taken can be weighting the sensor data on the basis of the associated rating. Additionally, the containing measure taken can also be not providing and/or not considering sensor data whose associated rating does not meet determined minimum requirements.

Step a) involves receiving GNSS satellite signals. The GNSS satellite signals are signals transmitted by one or more, generally by a multiplicity of, GNSS satellites in order to be able to use delay measurements to carry out position determinations. The GNSS satellite signals can be received directly by a GNSS sensor, or a receiver integrated in a GNSS sensor, or can be received by a GNSS receiver that is associated with and connectable to a GNSS sensor. The GNSS sensor can be a GNSS location sensor or a GNSS-based motion and/or position sensor, for example. The GNSS sensor can for example be arranged in or on a (motor) vehicle, such as for example an automobile. The automobile can be one designed for at least partially automated and/or autonomous driving operation, for example.

Step b) involves evaluating the received GNSS satellite signals to ascertain GNSS sensor data. The GNSS sensor data are usually the output data, or output signals, from a GNSS sensor. The GNSS sensor data in particular comprise and/or describe one or more of the following attributes (of the movement of a vehicle along the earth's surface): (current) position, velocity, attitude (alignment) and/or acceleration. The GNSS sensor data can for example be evaluated or ascertained independently of data and/or information from other sensors (of a vehicle), such as for example environment sensors (e.g. camera, RADAR, LIDAR and/or ultrasound) and/or (driving) state sensors (e.g. inertia sensors and/or wheel speed sensors), which, by way of illustration, can (directly) provide information about the environment (around the vehicle) and/or a (driving) state (of the vehicle) to, by way of illustration, other systems (of the vehicle).

Step c) involves rating the received GNSS satellite signals on the basis of at least one GNSS-specific performance criterion. The at least one performance criterion is GNSS-specific and therefore usually concerns (exclusively) attributes of a GNSS system, which generally comprises at least one or more GNSS satellites and at least one GNSS receiver. The performance criterion is in particular a criterion concerning the performance (performance capability), reliability and/or quality (or quality level) of GNSS satellite signals and/or the reception thereof. The performance criterion is in particular suitable for use to make a decision about whether (at least some of) the received GNSS satellite signals allow or do not allow an adequate performance (performance capability) in particular from a GNSS sensor.

The received GNSS satellite signals can for example be rated independently of data and/or information from sensors other than GNSS sensors (of a vehicle), such as for example environment sensors (e.g. camera, RADAR, LIDAR and/or ultrasound) and/or (driving) state sensors (e.g. inertia sensors and/or wheel speed sensors), which, by way of illustration, can (directly) provide information about the environment (around the vehicle) and/or a (driving) state (of the vehicle) to, by way of illustration, other systems (of the vehicle). The rating can therefore in particular also take place on the assumption that there is no sensor that directly provides (non-GNSS-specific) ambient conditions.

The rating can make use of one or more of the following pieces of (GNSS-specific) information, for example, which in particular can be ascertained or reconstructed from the GNSS satellite signals (for example during the evaluation of the received GNSS satellite signals): number of visible GNSS satellites, horizontal decrease in accuracy (horizontal dilution of precision, HDOP for short), carrier to noise ratio (CN/O for short), availability and/or age of GNSS correction data, number and/or type of received carrier frequencies, angle of elevation and/or state of the navigation message.

The rating can in particular make use of one or more of the following pieces of (GNSS-specific) information, for example, as a performance criterion:

number of satellites tracked: in particular as an indication of a critical reception situation. In a critical reception situation, such as for example beneath a bridge, beside a sound barrier, prior to entering a tunnel, etc., the number of visible GNSS satellites drops considerably.

horizontal dilution of precision (HDOP): as an indication of the geometry of the visible satellites. In critical surroundings (e.g. urban canyons), in which only satellites with high angles of elevation are visible, position estimation can solve an ill-posed problem, which generally leads to an increase in estimation uncertainty.

availability of correction data: in particular if positioning is intended to be carried out on the basis of PPP using SSR correction data, the unavailability of SSR correction data would be a clear indication that the performance of the output signals from a GNSS sensor cannot be assured.

carrier to noise ratio, in particular of tracked GNSS signals: in critical surroundings, the carrier to noise ratio (CN/O) usually drops considerably.

angle of elevation: the angle of elevation of satellites can be an (indirect) indication of the quality of the GNSS satellite signal (input signal for the GNSS sensor) and/or the likelihood of multipath propagation.

state of health of the navigation message: navigation messages generally describe the ephemerides, NAGO messages, etc., which can describe the reliability of the GNSS satellite signals.

A result provided and/or output for the rating can be an (determined) indicator that can indicate whether the performance (performance capability), reliability and/or quality (or quality level) of the GNSS satellite signals (and hence also of the GNSS sensor data ascertained therefrom) is adequate or inadequate. This means that the indicator can in particular (indirectly) also allow the environmental situation during reception of the GNSS satellite signals to be inferred, or can also (indirectly) be an indicator of the environmental situation. The indicator used can be a so-called flag, for example. This can generally assume one of two values, namely either performance (performance capability), reliability and/or quality (or quality level) of the GNSS satellite signals adequate (performance ensured, PE for short) or performance (performance capability), reliability and/or quality (or quality level) of the GNSS satellite signals inadequate (not performance ensured, NPE for short). An applicable indicator is particularly advantageous for allowing containing measures to be initiated as quickly as possible and/or with little computational complexity, in order in particular to be able to describe and/or guarantee the performance of the output signals from a GNSS sensor.

A result that is set for the rating (and hence associated with the GNSS sensor data) can be a flag as performance (performance capability), reliability and/or quality (or quality level) of the GNSS satellite signals inadequate (not performance ensured, NPE for short), for example, if one or more of the following criteria are satisfied:

number of visible satellites<a

HDOP>b correction data are unavailable and/or age of the correction data for a determined (minimum) number of satellites>c CN/O of a determined (minimum) number of signals<d angle of elevation of a determined (minimum) number of satellites<e navigation reports of a determined number of satellites are not healthy.

As an alternative to NPE, it is possible for a flag as PE (performance ensured) to be output for in particular the opposite criteria, said flag indicating that the performance (performance capability), reliability and/or quality (or quality level) of the GNSS satellite signals (and hence also of the GNSS sensor data ascertained therefrom) are adequate (and therefore the GNSS sensor data are usable). Determined threshold values can be prescribed for the values a, b, c, d and/or e, said threshold values being able to be coordinated experimentally and/or by simulations, for example.

Step d) involves associating a rating that results from step c) with the related GNSS sensor data. By way of example, the rating can be associated with the related GNSS sensor data (e.g. current position, velocity, attitude and/or acceleration) by virtue of the rating being provided, or output (by the GNSS sensor), in parallel with and/or at the same time as the GNSS sensor data. As such, the rating can be associated, by way of illustration, in the form of a flag that is set or remains set during output of the GNSS sensor data and is thereby associated with the applicable GNSS sensor data. The association can additionally be made in the form of a pair of values, for example, comprising the rating and the related GNSS sensor data.

According to one advantageous configuration, it is proposed that at least one GNSS-specific performance criterion concerns the number of GNSS satellites from which GNSS satellite signals were received (in particular without reflection or multipath propagation) (visible or unobscured GNSS satellites). By way of illustration, this performance criterion can be used to check whether the number of receivable or visible GNSS satellites is below a definable threshold value.

According to another advantageous configuration, it is proposed that at least one GNSS-specific performance criterion concerns the geometric constellation of available GNSS satellites. By way of illustration, this performance criterion can be used to check whether the in particular horizontal decrease in accuracy (horizontal dilution of precision, HDOP for short) for in particular a determined minimum number of satellites is above a definable threshold value.

According to another advantageous configuration, it is proposed that at least one GNSS-specific performance criterion concerns the relative arrangement of at least one GNSS satellite and the GNSS receiver. By way of illustration, this performance criterion can be used to check whether the angle of elevation for in particular a determined minimum number of satellites is below a definable threshold value.

According to another advantageous configuration, it is proposed that at least one GNSS-specific performance criterion concerns a request for GNSS correction data. By way of illustration, this performance criterion can be used to check whether (new) GNSS correction data for in particular a determined minimum number of satellites are available or were received. This performance criterion can alternatively or cumulatively be used to check whether the age of (if applicable already known) GNSS correction data for in particular a determined minimum number of satellites is above a definable threshold value.

According to another advantageous configuration, it is proposed that at least one GNSS-specific performance criterion concerns a request for the quality level (or quality) of the received GNSS satellite signals. By way of illustration, this performance criterion can be used to check whether the carrier to noise ratio (CN/O for short) for in particular a determined minimum number of satellites is below a definable threshold value.

According to another advantageous configuration, it is proposed that at least one GNSS-specific performance criterion concerns a request for the navigation message contained in GNSS satellite signals. By way of illustration, this performance criterion can be used to check whether the navigation message for in particular a determined minimum number of satellites is healthy or unhealthy. The navigation message usually also contains a component that describes the health status or state of health (or the technical state) of the satellite. This component can be checked in this regard.

According to another advantageous configuration, it is proposed that at least one GNSS-specific performance criterion concerns a request for the (number of) available carrier frequencies of GNSS satellite signals. By way of illustration, this performance criterion can be used to check whether two carrier frequencies for in particular a determined minimum number of satellites are received.

It is fundamentally possible to apply any combinations of two or more of the aforementioned performance criteria.

According to another advantageous configuration, it is proposed that at least one determinable (definable) rating (e.g.: NPE) or all ratings are not associated during a determinable (definable) spell (so-called bypassing). In this regard, the determinable spell can be a defined bypass period. During the bypass period, in particular the rating "performance (performance capability), reliability and/or quality (or quality level) of the GNSS satellite signals inadequate (not performance ensured, NPE for short)" is not associated. Additionally, there can be provision during the bypass period for the GNSS sensor data not to be provided alone, at least. During the bypass period, the GNSS sensor data can be ascertained by means of sensor fusion technique(s), for example, and therefore a GNSS sensor data output can be bypassed, for example. The bypass period can be applied for example upon and/or after entering an area in which significant obscuration of GNSS satellites can be expected (for example when entering a tunnel, when entering an urban canyon). It is thus possible, for a determined period, to still output GNSS sensor data for which adequate reliability can still be assumed, since they can still be based on signals that were received prior to entering the area, for example. The reliability can at least still be adequate for use in sensor fusion techniques (for example for a fusion with inertial data, or inertial navigation data and/or environment sensor data).

According to another advantageous configuration, it is proposed that when at least one determinable (definable) rating (e.g.: NPE) has been available for a determinable (definable) time interval, this rating is also associated with subsequently ascertained GNSS sensor data (recovery time). The determinable time interval can for example concern a recovery time in which the rating "performance (performance capability), reliability and/or quality (or quality level) of the GNSS satellite signals inadequate (not performance ensured, NPE for short)" is still associated, even though the result of the rating is actually already "performance (performance capability), reliability and/or quality (or quality level) of the GNSS satellite signals adequate (performance ensured, PE for short)". By way of example, the recovery time can be applied upon and/or after exiting an area in which significant obscuration of GNSS satellites can be expected (for example when exiting a tunnel, when exiting an urban canyon). It is thus possible to wait for a determined period until adequate reliability can be assumed again.

According to another advantageous configuration, it is proposed that the GNSS sensor data are provided together with the associated rating. Said GNSS sensor data can be provided to a superordinate (vehicle) system and/or a user interface, for example. Output of an NPE flag, for example, allows a superordinate (vehicle) system or a user to be left to decide whether the related GNSS sensor signals should be masked or not considered.

According to another advantageous configuration, it is proposed that only those GNSS sensor data whose associated rating satisfies at least one determined minimum requirement are provided. The minimum requirement can be for example that the associated rating is not consistent with the rating "performance (performance capability), reliability and/or quality (or quality level) of the GNSS satellite signals inadequate (not performance ensured, NPE for short)" and/or with the rating "performance (performance capability), reliability and/or quality (or quality level) of the GNSS satellite signals adequate (performance ensured, PE for short)". In this regard too, said GNSS sensor data can be provided to a superordinate (vehicle) system and/or a user interface, for example.

According to another aspect, a computer program for carrying out a method that is presented here is proposed. In other words, this concerns in particular a computer program (product), comprising commands that, when the program is executed by a computer, prompt said computer to perform a method that is described here.

According to another aspect, a machine-readable storage medium on which the computer program proposed here is deposited or stored is proposed. The machine-readable storage medium is normally a computer-readable data medium.

According to another aspect, a GNSS sensor is proposed that is designed to carry out a method that is described here. The GNSS sensor can be a GNSS sensor for a (motor) vehicle. In other words, this can in particular also be described such that the GNSS sensor can be arranged in or on a vehicle. The GNSS sensor can be formed in the style of a GNSS location sensor or a GNSS-based motion and position sensor or can be part of such a sensor. The GNSS sensor can therefore be a location device of a vehicle, for example. The GNSS sensor can for example comprise a computer and/or a control unit (controller) that can execute commands in order to perform the method. To this end, the computer or the control unit can execute the specified computer program, for example. The computer or the control unit can for example access the specified storage medium in order to be able to execute the computer program.

The details, features and advantageous configurations discussed in connection with the method can accordingly also arise for the computer program and/or storage medium and/or GNSS sensor presented here, and vice versa. In this respect, reference is made to the entire content of the embodiments there for the purpose of characterizing the features in more detail.

Figure 2:
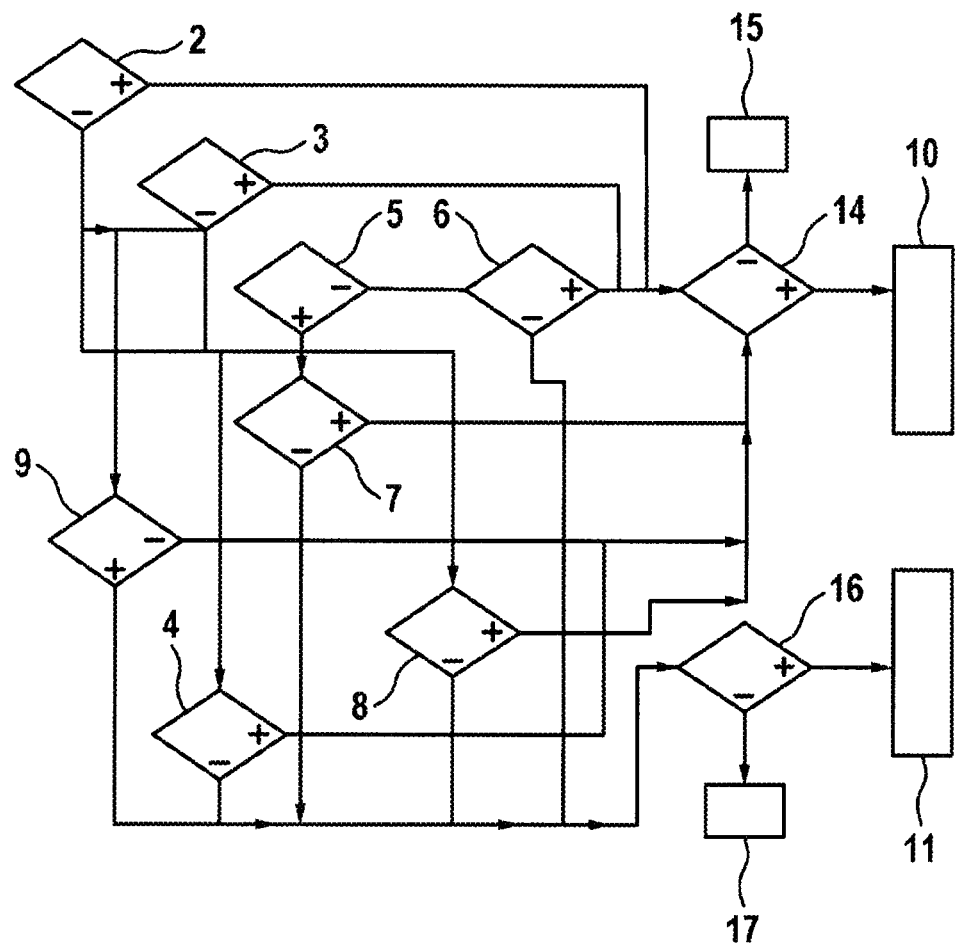
Figure 3:
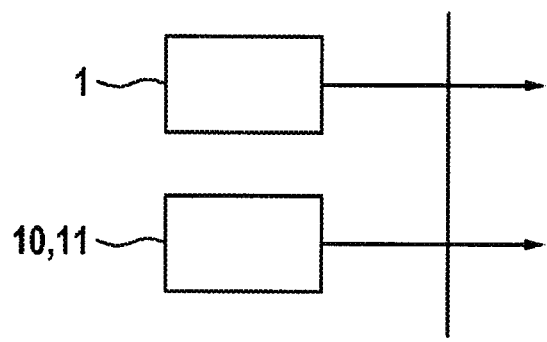
Figure 4:
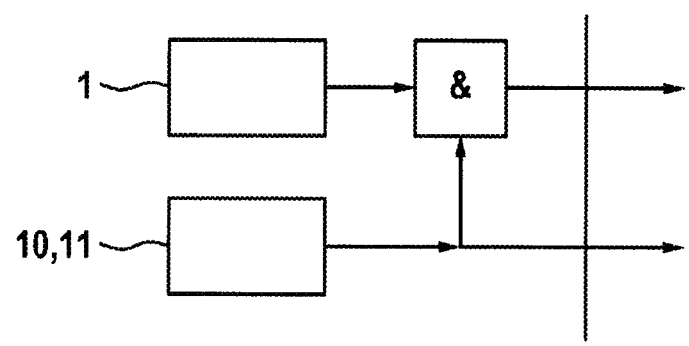
Figure 5:
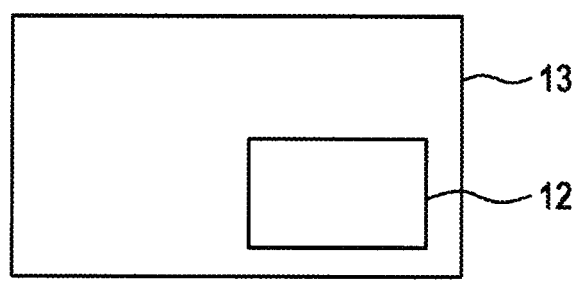

The solution presented here and the technical context for said solution are explained in more detail below with reference to the figures. It should be pointed out that the disclosure is not intended to be restricted by the exemplary embodiments shown. In particular, unless explicitly shown otherwise, it is also possible to extract partial aspects of the substantive matter explained in the figures and to combine said partial aspects with other parts and/or insights from other figures and/or the present description. In the figures:

FIG. 1: schematically shows an illustrative flow diagram for the method presented here, FIG. 2: schematically shows an illustrative flow diagram for step c) of the method, FIG. 3: schematically shows an illustrative flow diagram for step d) of the method, FIG. 4: schematically shows another illustrative flow diagram for step d) of the method, and FIG. 5: schematically shows an illustrative use of a GNSS sensor that is described here.

DETAIL DESCRIPTION

FIG. 1 schematically shows an illustrative flow diagram for the method presented here. The method is used to provide GNSS sensor data 1 (cf. FIGS. 2, 3 and 4). The order of steps a), b), c) and d) that is depicted by the blocks 110, 120, 130 and 140 is illustrative and can be taken at least once in the depicted order for the purpose of carrying out the method, for example.

In block 110, step a) involves receiving GNSS satellite signals. In block 120, step b) involves evaluating the received GNSS satellite signals to ascertain GNSS sensor data 1. In block 130, step c) involves rating the received GNSS satellite signals on the basis of at least one GNSS-specific performance criterion 2, 3, 4, 5, 6, 7, 8, 9. In block 140, step d) involves associating a rating 10, 11 that results from step c) with the related GNSS sensor data 1.

FIG. 2 schematically shows an illustrative flow diagram for step c) of the method. In this regard, FIG. 2 in particular shows examples of various performance criteria 2, 3, 4, 5, 6, 7, 8, 9 that can be useful for rating the GNSS satellite signals. As such, FIG. 2 illustrates for example that at least one GNSS-specific performance criterion 2 can concern the number of visible GNSS satellites. By way of illustration, the performance criterion 2 is used to check whether the number of visible GNSS satellites is below a definable threshold value.

In this regard, FIG. 2 additionally illustrates for example that at least one GNSS-specific performance criterion 3 can concern the geometric constellation of available GNSS satellites. By way of illustration, the performance criterion 3 is used to check whether the in particular horizontal decrease in accuracy (horizontal dilution of precision, HDOP for short) is above a definable threshold value.

In this regard, FIG. 2 additionally illustrates for example that at least one GNSS-specific performance criterion 4 can concern the relative arrangement of at least one GNSS satellite and the GNSS receiver. By way of illustration, the performance criterion 4 is used to check whether the angle of elevation in particular of determined satellites is below a definable threshold value.

In this regard, FIG. 2 additionally illustrates for example that at least one GNSS-specific performance criterion 5, 6 can concern a request for GNSS correction data. By way of illustration, the performance criterion 5 is used to check whether (new) GNSS correction data are available or were received. By way of illustration, the performance criterion 6 is used to check whether the age of (if applicable already known) GNSS correction data is above a definable threshold value.

In this regard, FIG. 2 additionally illustrates for example that at least one GNSS-specific performance criterion 7 can concern a request for the quality level of the received GNSS satellite signals. By way of illustration, the performance criterion 7 is used to check whether the carrier to noise ratio (CN/O for short) in particular of a determined number of satellites is below a definable threshold value.

In this regard, FIG. 2 additionally illustrates for example that at least one GNSS-specific performance criterion 8 can concern a request for the navigation message contained in GNSS satellite signals. By way of illustration, the performance criterion 8 is used to check whether the navigation message in particular of a determined number of satellites is unhealthy.

In this regard, FIG. 2 additionally illustrates for example that at least one GNSS-specific performance criterion 9 can concern a request for the available carrier frequencies of GNSS satellite signals. By way of illustration, the performance criterion 9 is used to check whether two carrier frequencies in particular for a determined number of satellites were received.

The paths shown in FIG. 2 between the performance criteria 2, 3, 4, 5, 6, 7, 8, 9 illustrate the integration of the performance criteria 2, 3, 4, 5, 6, 7, 8, 9 into the overall rating. Which path is taken onward after a performance criterion 2, 3, 4, 5, 6, 7, 8, 9 is dependent on whether the criterion in question is satisfied (+) or not (−). The integration of the performance criteria 2, 3, 4, 5, 6, 7, 8, 9 is illustrative in this case, and it is naturally possible for only fewer criteria or, if applicable, also further criteria to be used for the rating as well.

Moreover, FIG. 2 also illustrates an example of the circumstance that, and if applicable how, at least one determinable rating 10 or all ratings 10, 11 cannot be associated during a determinable spell. This is realized here, by way of illustration, by means of a first time criterion 14 and a first counter 15. By way of illustration, the first time criterion 14 checks whether a defined bypass period is at an end. In this regard, the defined bypass period is an example of the determinable spell. If the bypass period is not yet at an end, the rating 10 and/or the ratings 10 and 11 cannot be output and associated. At the same time, the counter 15 can be increased by for example the value one, or a time step, in this case, and if applicable the method can be repeated in a new time step or with newly received GNSS satellite signals.

If the bypass period is at an end, the rating 10 can be output and associated. By way of example, the rating 10 here is the statement that an adequate performance, or quality level, cannot be ensured for the GNSS sensor data 1 that were ascertained on the basis of the received and rated GNSS satellite signals. By way of example, this can be realized by setting a so-called flag with the content NPE (not performance ensured) as rating 10. Setting the flag allows the applicable rating information to be associated with the GNSS sensor data 1.

Moreover, FIG. 2 also illustrates an example of the circumstance that, and if applicable how, when at least one determinable rating 10 has been available for a determinable time interval, this rating 10 can also be associated with subsequently ascertained GNSS sensor data. By way of illustration, this is realized here by means of a second time criterion 16 and a second counter 17. By way of illustration, the second time criterion 16 checks whether a defined recovery period is at an end. In this regard, the defined recovery period is an example of the determinable time interval. If the recovery period is not yet at an end, the rating 10 may continue to be output and associated, in particular if it was output and associated beforehand. At the same time, the counter 17 can be increased by for example the value one, or a time step, in this case, and if applicable the method can be repeated in a new time step or with newly received GNSS satellite signals.

If the recovery period is at an end, the rating 11 can be output and associated. By way of example, the rating 11 here is the statement that an adequate performance, or quality level, can be ensured for the GNSS sensor data 1 that were ascertained on the basis of the received and rated GNSS satellite signals. By way of example, this can be realized by revoking or turning off a flag that was set beforehand with the content NPE as rating 11. Alternatively or cumulatively, a flag with the content PE (performance ensured) can be set. Turning off the NPE flag and/or setting the PE flag allows the applicable rating information to be associated with the GNSS sensor data 1.

FIG. 3 schematically shows an illustrative flow diagram for step d) of the method. By way of illustration, said flow diagram illustrates that the GNSS sensor data 1 can be provided together with the associated rating 10, 11. Said GNSS sensor data can be provided to a superordinate vehicle system and/or a user interface, for example.

FIG. 4 schematically shows another illustrative flow diagram for step d) of the method. By way of illustration, said flow diagram illustrates that only those GNSS sensor data 1 whose associated rating 10, 11 satisfies determined minimum requirements are provided. By way of example, there can be provision for only those GNSS sensor data 1 whose associated rating is not consistent with the rating 10 or does not contain an NPE flag to be provided. Said GNSS sensor data can be provided to a superordinate vehicle system and/or a user interface, for example.

FIG. 5 schematically shows an illustrative use of a GNSS sensor 12 that is described here. The GNSS sensor 12 is designed to carry out the method described. Additionally, by way of illustration, the GNSS sensor 12 is integrated in a (motor) vehicle 13, such as for example an automobile, which is preferably designed for at least partially automated and/or autonomous driving operation.

The invention claimed is:

1. A method for providing GNSS sensor data, the method comprising:
   a) receiving GNSS satellite signals;
   b) evaluating the received GNSS satellite signals to ascertain GNSS sensor data;
   c) rating the received GNSS satellite signals based on at least one GNSS-specific performance criterion;
   d) associating a rating that results from step c) with the GNSS sensor data; and
   e) providing only those of the GNSS sensor data whose associated rating satisfies at least one determined minimum requirement.

2. The method according to claim 1, wherein the at least one GNSS-specific performance criterion concerns a number of GNSS satellites from which GNSS satellite signals were received.

3. The method according to claim 1, wherein the at least one GNSS-specific performance criterion concerns a geometric constellation of available GNSS satellites.

4. The method according to claim 1, wherein the at least one GNSS-specific performance criterion concerns a relative arrangement of at least one GNSS satellite and a GNSS receiver.

5. The method according to claim 1, wherein the at least one GNSS-specific performance criterion concerns a request for GNSS correction data.

6. The method according to claim 1, wherein the at least one GNSS-specific performance criterion concerns a request for a quality level of the received GNSS satellite signals.

7. The method according to claim 1, wherein the at least one GNSS-specific performance criterion concerns a request for the navigation message contained in GNSS satellite signals.

8. The method according to claim 1, wherein the at least one GNSS-specific performance criterion concerns a request for the available carrier frequencies of GNSS satellite signals.

9. The method according to claim 1, wherein at least one of (i) at least one determinable rating and (ii) all ratings are not associated during a determinable spell.

10. The method according to claim 1 further comprising:
    in response to at least one determinable rating having been available for a determinable time interval, associating the at least one determinable rating with subsequently ascertained GNSS sensor data.

11. The method according to claim 1 further comprising:
    providing the GNSS sensor data together with the associated rating.

12. The method according to claim 1, wherein the method is carried out by executing a computer program.

13. The method according to claim 1, wherein:
    evaluating the received GNSS satellite signals to ascertain GNSS sensor data includes using a GNSS sensor to generate data associated with at least one of a current position, a velocity, an attitude, and an acceleration of the GNSS sensor; and
    rating the received GNSS satellite signals includes identifying the GNSS satellite signals as performance ensured or not performance ensured based upon one or more of
        whether a number of visible satellites is less than a visible satellite threshold,
        whether horizontal dilution of precision (HDOP) is greater than an HDOP threshold,
        whether correction data are unavailable and/or age of the correction data for a determined minimum number of satellites is greater than an age threshold,
        whether a carrier to noise ratio is less than a carrier to noise ratio threshold,
        whether an angle of elevation of a determined number of satellites is less than an angle of elevation threshold, and
        whether navigation reports of a determined number of satellites indicate the respective satellites are not healthy.

14. The method of claim 1, wherein associating the rating and the GNSS sensor data comprises at least one of:
   setting a not performance ensured flag for the GNSS sensor data based upon the rating of the GNSS sensor data;
   setting a performance ensured flag for the GNSS sensor data based upon the rating of the GNSS sensor data; and
   outputting the rating with the related GNSS sensor data.

15. The method according to claim 1, wherein providing only those of the GNSS sensor data whose associated rating satisfies at least one determined minimum requirement comprises providing only those of the GNSS sensor data whose associated rating satisfies at least one of
   a number of visible satellites meets or exceeds a visible satellite threshold,
   a horizontal dilution of precision (HDOP) meets or exceeds an HDOP threshold,
   correction data are available and age of the correction data for a determined minimum number of satellites is less than an age threshold,
   a carrier to noise ratio meets or exceeds a carrier to noise ratio threshold,
   an angle of elevation of a determined number of satellites meets or exceeds an angle of elevation threshold, and
   navigation reports indicate that a determined number of healthy satellites meets or exceeds a healthy satellite threshold.

16. A non-transitory machine-readable storage medium that stores a computer program for providing GNSS sensor data, the computer program configured to, when executed, perform the method of claim 1.

17. A GNSS sensor for providing GNSS sensor data, the GNSS sensor configured to:
   a) receive GNSS satellite signals;
   b) evaluate the received GNSS satellite signals to ascertain GNSS sensor data;
   c) rate the received GNSS satellite signals based on at least one GNSS-specific performance criterion;
   d) associate a rating that results from step c) with the GNSS sensor data; and
   e) provide only those of the GNSS sensor data whose associated rating satisfies at least one determined minimum requirement.

18. A method for providing GNSS sensor data, the method comprising:
   a) receiving GNSS satellite signals;
   b) evaluating the received GNSS satellite signals to ascertain GNSS sensor data;
   c) rating the received GNSS satellite signals based on at least one GNSS-specific performance criterion; and
   d) associating a rating that results from step c) with the GNSS sensor data, wherein at least one of (i) at least one determinable rating and (ii) all ratings are not associated during a determinable spell.

* * * * *